(12) United States Patent
Boivin et al.

(10) Patent No.: US 8,699,586 B2
(45) Date of Patent: Apr. 15, 2014

(54) POWERLINE CONTROL INTERFACE IN CENELEC (EU) A-D BANDS FREQUENCY AND AMPLITUDE MODULATION TRANSMITTER

(76) Inventors: Didier Boivin, Santa Clara, CA (US); Michel Gaeta, La valette du var (FR)

( * ) Notice: Subject to any disclaimer, the term of this patent is extended or adjusted under 35 U.S.C. 154(b) by 34 days.

(21) Appl. No.: 13/492,797

(22) Filed: Jun. 8, 2012

(65) Prior Publication Data

US 2012/0314782 A1    Dec. 13, 2012

Related U.S. Application Data (63) Continuation-in-part of application No. 13/227,891, filed on Sep. 8, 2011.

(60) Provisional application No. 61/495,924, filed on Jun. 10, 2011.

(51) Int. Cl.
 *H04B 3/54* (2006.01)
(52) U.S. Cl.
 USPC ........... 375/257; 375/224; 375/295; 375/238; 375/288; 375/312; 375/314; 375/315; 375/219
(58) Field of Classification Search
 USPC ......... 375/224, 295, 238, 257, 288, 312, 314, 375/315, 219
 See application file for complete search history.

(56) References Cited

U.S. PATENT DOCUMENTS

| | | | | |
|---|---|---|---|---|
| 3,723,774 | A | * | 3/1973 | Rogers ........................... 361/101 |
| 3,912,877 | A | * | 10/1975 | Braun et al. .................. 340/2.21 |
| 4,924,170 | A | * | 5/1990 | Henze ........................... 323/272 |
| 6,459,363 | B1 | * | 10/2002 | Walker et al. ................. 375/238 |
| 6,686,832 | B2 | | 2/2004 | Abraham |
| 6,856,195 | B2 | * | 2/2005 | Ranmuthu ....................... 330/86 |
| 6,922,135 | B2 | | 7/2005 | Abraham |
| 8,111,761 | B2 | * | 2/2012 | Hershbarger ................. 375/258 |
| 2004/0246108 | A1 | | 12/2004 | Robertson et al. |
| 2010/0069024 | A1 | * | 3/2010 | Daanen et al. ............. 455/127.1 |
| 2011/0006606 | A1 | * | 1/2011 | Hashimoto et al. ............. 307/52 |
| 2011/0062781 | A1 | * | 3/2011 | Liao ................................ 307/43 |
| 2012/0099661 | A1 | * | 4/2012 | Fornage ........................ 375/257 |
| 2012/0314747 | A1 | * | 12/2012 | Boivin et al. ................. 375/224 |
| 2012/0314781 | A1 | * | 12/2012 | Boivin et al. ................. 375/257 |

FOREIGN PATENT DOCUMENTS

| | | |
|---|---|---|
| AU | 6462298 A | 9/1998 |
| CA | 2153140 A1 | 1/1996 |
| CA | 2491604 | 1/1996 |
| CA | 2249164 A1 | 4/1999 |
| EP | 1197011 | 4/2002 |
| WO | WO 03/065597 | 8/2003 |
| WO | WO 2006/113945 | 10/2006 |
| WO | WO 2009/125080 | 10/2009 |

* cited by examiner

*Primary Examiner* — Siu Lee
(74) *Attorney, Agent, or Firm* — Alexander Chen, Esq.

(57) ABSTRACT

An apparatus is disclosed where a Powerline interface is used to transmit data into the powerline grid network, where the powerline interface is pulling the required transmit energy from the power grid network, where the powerline interface is transmitting data using standard narrow band modulation such as ASK, FSK, S-FSK, where the transmitted data are passed on to the powerline interface by the use of an "Input signal" adapation stage, where an error calculation and a comparison to a "Triangle" signal is performed to create a command signal used to enable the transmission of data by providing enough voltage to polarize the Transistor (i.e: MOS FET) used in the powerline path.

9 Claims, 6 Drawing Sheets

POWERLINE CONTROL INTERFACE IN CENELEC (EU) A-D BANDS FREQUENCY AND AMPLITUDE MODULATION TRANSMITTER

CROSS REFERENCE TO RELATED APPLICATION

This application is a continuation-in-part of U.S. pending patent application Ser. No. 13/227,891 entitled "Powerline Control Interface for Frequency and Amplitude Modulation Transmitter" which was filled Sep. 8, 2011 in the US Patent & Trademark Office which claims the benefits of priority to the filing date of U.S. provisional patent application No. 61/495,924 entitled "New innovative Powerline Communication (PLC) solutions" which was filed Jun. 10, 2011. Both are incorporated by reference herein.

FIELD OF THE INVENTION

The present invention relates to a type of Powerline Communication interface in the low frequency bands (from few KHz to few hundred KHz), also called BF power line coupler, and more specifically to an ultra low power, low cost Powerline Interface (PI) between a PHY standard modulation, demodulation (MODEM) and the power wires used to connect all devices in their eco-system (Alternating Current [AC] or Direct Current [DC] depending on the application).

BACKGROUND OF THE INVENTION

Evolution of existing Powerline Communication technologies imposes a need to improve performances of the power line coupler, more specifically when it comes to the use of PLC communication solution in the low frequency bands (denoted LFB) going from a few KHz to few hundreds of Khz.

While a continuation of the U.S. pending patent application Ser. No. 13/227,891 entitled "Powerline Control Interface for Frequency and Amplitude Modulation Transmitter", the focus of our invention remains at the Physical Layer in PowerLine Communications (PLC) environment.

Consequently the present invention was conceived to improve the performances of a Powerline Interface (PI), in the LFB plan, to transmit data on the power line by using ("pulling") the required current (denoted: Current) from the power line and therefore reducing the overall power consumption of the transmit system to only few milli-watts required by the electronics of the PI.

As a consequence of this present invention, power dissipation issues in the LFB for some of the components directly connected to the power line are significantly reduced and therefore facilitating the deployment of standard modulation PLC solutions into forms factors that were not possible until now due to some reliability concerns.

Furthermore, the goal of the present invention is to provide a solution for the PLC Line coupler, which is independent of the type of PHY narrow band modulation (ASK, FSK, S-FSK, etc. . . . ) and the frequency band plan. With proper adaptation of some of the electronics, the invention can be used in any of the LFB relevant to the smart grid market, such as:

CENELEC (EU) A/B/C/D bands (3 Khz to 148.5 KHz),
ARIB (Japan) band (10 Khz to 450 Khz),
FCC (US) bands (10 KHz to 490 KHz)

OBJECT OF THE INVENTION

The reason for the invention is to improve performances in the low frequency band (LFB) compared to PLC coupler as defined in the U.S. pending patent application Ser. No. 13/227,891 entitled "Powerline Control Interface for Frequency and Amplitude Modulation Transmitter". While still looking at providing an ultra low power, low cost and small form factor Powerline Interface (PI) as part of a PLC Communication system, the object of this invention focus on: a) performances improvement in the LFB; b) power dissipation improvement over previous solution and mostly in the LFB. Like most of the traditional PLC communication system, the invention is used in an AC power environment, but can be used also in a DC power distribution network, thus depending on the applications.

An additional object of the present invention provides improvements in term of system power consumption by generating a Transmit signal ("Pulling"), in the LFB Plan, from the power line versus existing PLC technology that drive transmit power ("Pushing") into the power lines using inductive or capacitive coupling to the power wires.

Further object of the present invention is to use a "V_Enable" signal to enable the transmission of data by providing enough voltage to create a reference signal used in the Input signal path. Therefore, the rhythm of the apparition of the modulation signal is controlled. Additionally, the voltage, when set to zero volt, disables all the transmit path of the system and therefore turn off the overall supply power needed for the transmit path.

Another object of the invention is to be able to use any existing narrow band modulation as part of the overall PHY modulation stage of the system. Standard modulations such as ASK, FSK, S-FSK, etc. . . . within a defined frequency bandwidth can be transmitted through the use of the invention.

Further object of the invention is to leverage existing Receiver processing circuit (DSP) to receive data signals, which are compatible with the existing systems when using the same modulation and frequency bands. Therefore, the invention allows for some compatibility with systems already deployed in the field.

Further object of the invention provides a more desirable low cost, small form factor solution to provide a PLC line coupler due to the reduced number of components needed.

In addition to the above, the invention is also independent of the protocols used by the upper layers and can find its use in markets like, Smart meters, Home Energy Management network, Plug-In Electric Vehicles (PEV), Photovoltaic (PV) solar power markets, to name only few of them.

One can also use this invention in any DC environment like PV optimizers, Home Automation (i.e: HVAC control system), AC/DC or DC/DC Power supply markets (i.e: it can be used in the context of "smart" power supply allowing a Grid operator to have a direct impact on the use or not of equipment in its network).

SUMMARY OF THE INVENTION

Embodiments of the present invention is to create a method to generate Standard Transmit signal ("Pulling") from the power line as it connects between two wires of the power network through a diode rectifier (to insure proper signal adaptation) followed by a Transistor (i.e: MOS FET) and some adapted Filtering circuit to significantly reduce the required power for the transmit stage for modulating the signal of a network voltage.

Further embodiment of the present invention is to have a single power rail on the board as the transmit stage is pulling power from the power line through the use of a Transistor (i.e:

MOS FET) and an adapted Filtering circuit and therefore eliminating the need for other Transmit power supply rail (i.e: no need for a 12 Voltage rail).

Further embodiment is to generate a Command signal for the Transistor (i.e: MOS FET) that will create the Standard Transmit signal from the power line. The Command signal is generated during the transmission by comparing a pre-defined Triangle signal and a Generated Error signal. Some electronics are used to produce both the Triangle and the error signal voltages allowing a Linear Amplifier to commute and then command the Transistor (i.e: MOS FET) by creating the minimum power consumption for polarization of Transistor (i.e: MOS FET).

Another embodiment of the present invention is to use a Linear Amplifier circuit to subtract a Scaled Standard Modulation signal to a Reference Transmit signal and therefore creating an Error signal that will use to command the Transistor
(i.e: MOS FET) and in order to generate Standard Transmit signal ("Pulling") from the power line.

Additional embodiment of the present invention is to use a Capacitor/Resistors circuit to offset and scale the Input signal to be used to: a) generate a Command signal for the Transistor (i.e: MOS FET); b) to define the transmit power level of the Standard Transmit signal ("Pulling") from the power line.

Further embodiment during the idle phase (reception), is to set the V_Enable signal to zero volt, reducing the overall supply power of the transmit path.

It is desirable that the amplitude of the alternative voltage (AC) of the Power distribution network is greater than the threshold of the Transistor (i.e: MOS FET) to be polarized. This Current modulation is independent of the network impedance as long as it stays higher than the required voltage for the polarization of the Transistor (i.e: MOS FET) and inductance/resistor voltage.

Embodiment of the present invention is to be able to generate some modulation signals leveraging Standard Modulation (such as ASK, FSK, S-FSK, etc. . . . ) as they are used in many smart grid system and those being in the LFB, such as CENELEC bands. Higher frequency bands can also supported with the present invention, but will be better supported by the U.S. pending patent application Ser. No 13/227,891 entitled "Powerline Control Interface for Frequency and Amplitude Modulation Transmitter".

Further embodiment of the invention includes a processing circuit to receive data signals, which are compatible with system using same Standard Modulation (same modulation and frequency bands) than the present invention. Therefore, the invention allows to keeping some compatibility (interoperability) with systems already deployed in the field.

An additional embodiment of the present invention is the possibility to use the invention in a DC power distribution environment by using similar electronics concept to the AC system but without the front adaptation stage created by the diode rectifier circuit.

Furthermore, the present invention in the context of a DC power distribution environment supports the transmission of the signal in a continuous mode.

Embodiments of the present invention are directed to better control of the amplitude of the modulated signal, in particular with regard to electromagnetic compatibility rules of Electromagnetic Interference/Electromagnetic Compatibility (EMI/EMC).

BRIEFS DESCRIPTIONS OF THE DRAWINGS

The present invention will be better understood and fully appreciated when read in conjunction with the appended drawings. It should be understood, however, that the present invention is not limited to the precise arrangements and instrumentations as shown in the drawings.

DETAILED DESCRIPTIONS OF THE EMBODIMENTS

Figure 1:
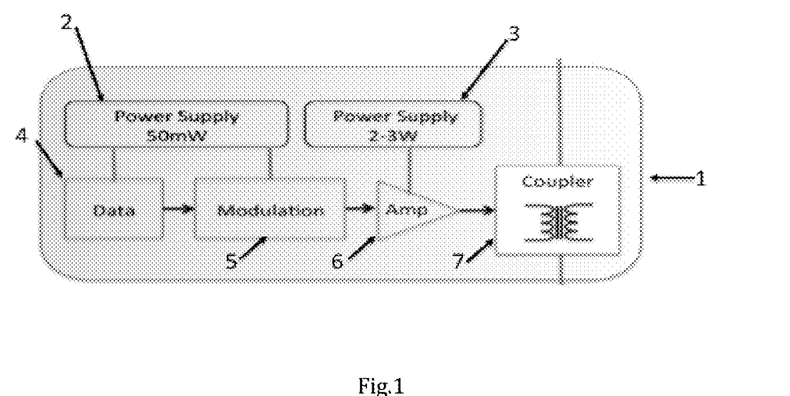
FIG. 1 shows a conventional Powerline Communication coupler.

FIG. 1 shows a complete system 1 leveraging existing PLC technology for LFB (or High) frequency band plan. Unfortunately, most of the communication system used today in most of the PLC solution is a "Pushing" communication system 1 compare to our invention approach, which is a "Pulling" communication system 8. As a result by leveraging the present invention, systems, like smartgrid systems, are a) most cost effective solution due to its reduced number of components; b) ultra low power energy inefficient communication solution due to the absence of powerline drivers in the communication interface; c) improving the performances of the overall system due to need of less power supply for the overall system. Other advantages of this type of solution are security, remote management, etc. . . .

In this system 1, Data 4 and Modulation 5 blocks are related to the Physical layer (PHY) and allow to generating Standard Modulation signals for the line coupler 7. Those signals are then pass on to a line driver 6 to create the transmit power signal to go through the line coupler (i.e: U.S. Pat. No. 7,078,982). Traditional line couplers are most of the time either inductive (using transformers) or capacitive (using capacitors). As mentioned in the FIG. 1, power supply 3 for these types of couplers can be up to few watts in the context of narrow frequency band system and even higher when using large frequency band system.

U.S. Pat. No. 7,078,982 provides a method wherein such high frequency oscillations are used to carry data through an electric network. The high-frequency oscillations are generated by the line coupler, comprising an electric element in series with a switch, the whole being connected between two wires of the electric network. A control signal carrying data is applied to the switch and alternately allows the switch to be closed and opened. Thus, the rhythm of the apparition of the high-frequency oscillations is controlled.

Figure 2:
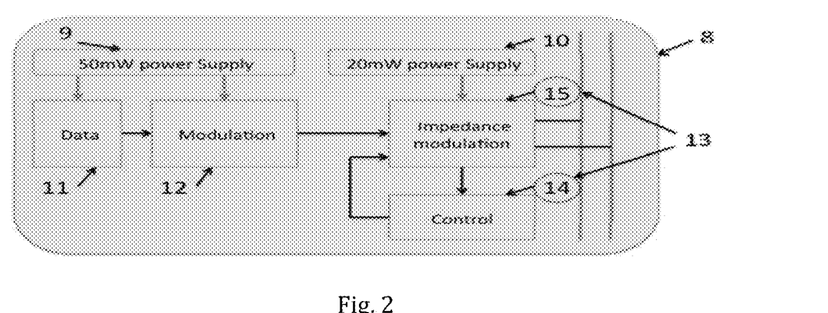
FIG. 2 presents a modified line coupler reflecting the embodiments bring by the present invention.

FIG. 2 shows a system 8 leveraging the present invention 13 which also support either narrow or large frequency band in any frequency band plan for transmission of Standard Modulation. In this new system 8, Data 11 and Modulation 12 blocks are related to the Physical layer (PHY) and are similar to the blocks shown in FIG. 1.

The modulation signals for the line coupler are then going through some electronics (represented in this FIG. 2 as a Linear Amplifier 14) uses to off-set, scale and control the output impedance, which is creating a Current modulation to be applied to Transistor (i.e: MOS FET 15) which is pulling the transmit power from the power lines contrarily to the line coupler 7 in FIG. 1.

As a result (as shown in FIG. 2), power supply 10 requirement for this new system is only a few ten of milli-watts for both a narrow frequency band system and a large frequency band system.

The U.S. pending patent application Ser. No. 13/227,891 entitled "Powerline Control Interface for Frequency and Amplitude Modulation Transmitter" allows improvements in term of types of modulation to transmit over power wires versus existing PLC technology leveraging similar "Pulling" type of coupling to the power line.

The present invention allows performances improvements in term of Standard Transmit signal related to the power line impedance. It also allows further improvement in term of reducing the power dissipation of the overall system and more importantly of the Transistor 15 connected directly to the powerline.

Existing PLC technology generates transmit signal for "amplitude modulation" only by creating a single transmit Pulse (WO 2006/008381 International Application number) or by creating Multiple transmit Pulses (FR 08 01520 and U.S. Ser. No. 12/185,312) for a single data bit versus the present invention which can support any Standard narrow band Modulations (such as ASK, FSK, S-FSK, etc. . . . ) with limited frequency bandwidth depending on the chosen standard modulation (Standard Modulations).

Figure 3:
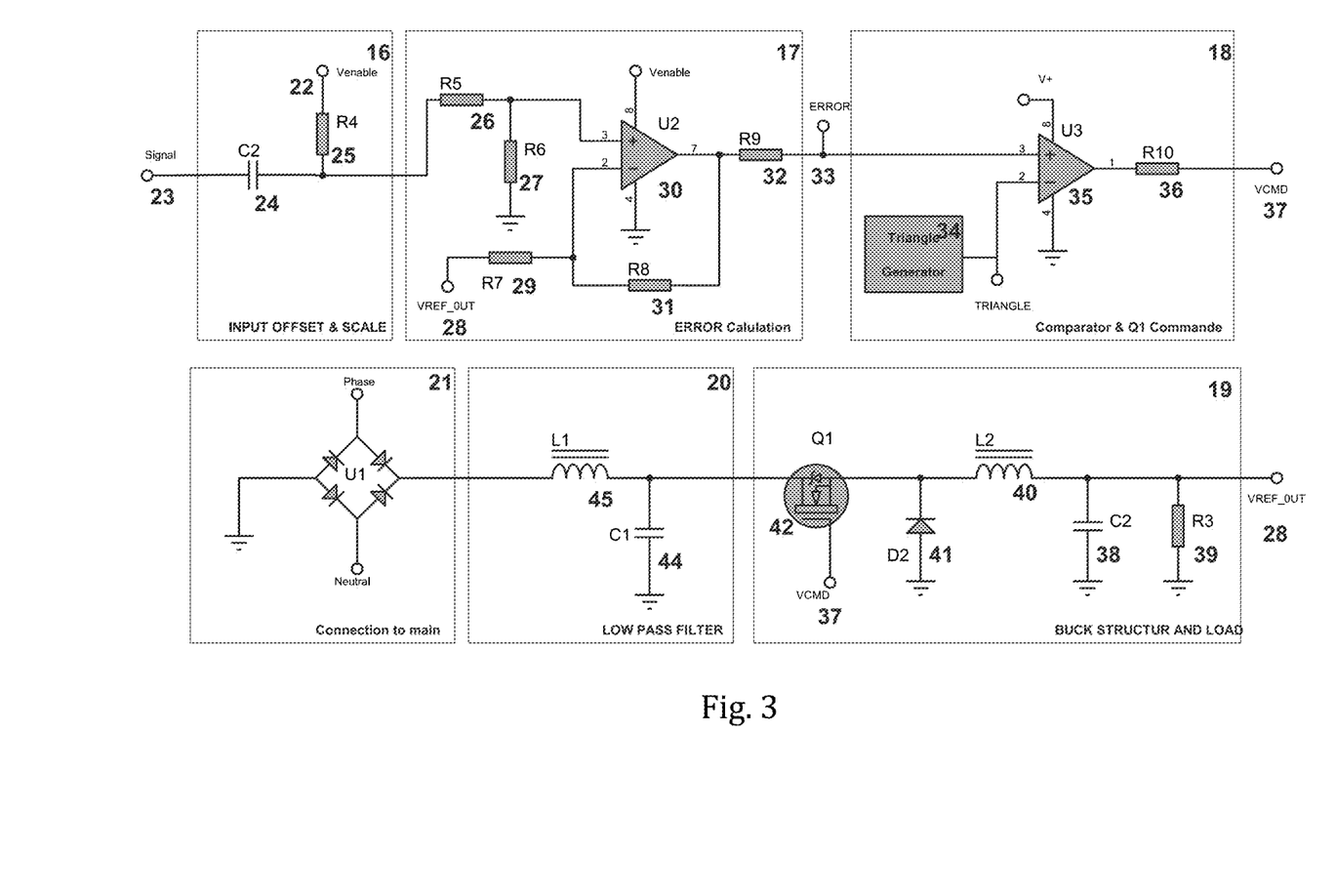
FIG. 3 shows an electrical circuit diagram of the line coupler 13 reflecting the embodiments bring by the invention when use in an AC power distribution environment.

FIG. 3 shows a system representing the invention in the context of an AC power network. The description of the present invention is mostly related to the transmission part of a PLC system and is comprising of three (6) blocks for transmitting data through the line coupler:

The Off-set & Scale Input signal block 16
The Error calculation block 17
The Command block 18
The Transmit signal block 19
A Low Pass Filter block 20
The Rectifier, 21.

The Transmit signal block 19 is mostly acting like a "Buck" convertor to facilitate the transmission of the Standard Modulation signal (Signal) by creating enough voltage to be pulled from the powerline. Modulations type such as ASK, FSK, S-FSK, etc. . . . can be used with the invention.

The following considerations are critical to the invention:

A regulated generator of current is used and directly connected to the power supply 22 (V+). It is important to notice that 22 (V+) voltage can be at +5V depending of the minimum voltage required to polarizing Transistors (i.e: MOS FET) 42 (Q1).

During the idle phase (reception), the 22 (V_Enable) signal is set to zero volt to disable all the transmit path of the system and therefore reducing the overall supply power needed for the transmit path.

The V_Enable, 22, connection is used as transmission enable signal and can be also [V+] and is used as a power supply for the PLC Line coupler transmit side. During the transmission phase, 22, V_Enable signal is active.

When 22 (V_Enable) is active, the Input signal 23 is transmitted through the electronics of the block 16. The purpose of this block is to generate a Reference signal with no offset and amplitude that translate directly into the level of the power Standard Transmit signal on the powerline. The offset is done by the capacitor 24 and the scale function by a resistive divider 25 and 27 (resistors).

The Reference signal from block 16 is then subtracted from the VRef Out signal 28 coming from the Transmit block 19. Vref_out signal 28 corresponds to an image of the current absorbed from the grid. The variation of this current is equivalent to the desired impedance modulation. So using the desired reference signal and created Vref_out, one can build an Error signal 33 that will be used for regulation by the Command block 18.

The Command block 18 must first perform a comparison with the generated Error signal 33 and a created Triangle signal 34. The result of this comparison done by 35 (Amp Linear) create the Command signal 37 for which the ON and OFF cycle is directly dependent of the Error signal 33. When ON, the minimum power consumption for polarization of the Transistor (i.e: MOS FET) 42 (Q1) is applied. No power is transmitted on the line from the power supply. Only the coulombs to trigger the Transistor (i.e: MOS FET) 42 (Q1) are needed.

Block 34 is Triangle generator use to perform the comparison and its electronics is public knowledge and not relevant to this invention.

Modulation thru the transmit block 19 and more specifically Transistor (i.e: MOS FET) 42 (Q1) is achieved by sending the data to modulate thru the "Input" signal 23 to create the voltage for the command of Transistor (i.e: MOS FET) 42 (Q1).

Block 19 is designed in a similar way than a voltage convertor used in a Buck mode (step-down mode). The duty cycle of the Buck is dependant on the Command signal 37. As a result the Inductor 40 is accumulating energy when the command signal 37 is ON. When OFF, then the energy is transferred to 40 (inductor) and 38 (Resistor). 39 and 40 are making a low pass filter with a cutoff frequency that have be higher than the frequency band used by the Standard Transmit signal. 38 and 39 are also a low pass filter with a cutoff frequency that should also be higher than the frequency band used by the Standard Transmit signal. Voltage at 39 is unstable as it is also transferring energy in 38.

As a result, Transistor 42 periodically "pulled" energy from the powerline in direct relation with the Error signal 33 as a result of its adaptation to the Input signal 23. The communication power is not provided by the transmitter as in traditional PLC solution but it is pulled from the use of the Transistor (i.e: MOS FET) 42 (Q1), and other circuit (38, 39, 40) and therefore allowing to reduce significantly the required power for the transmit stage and also reducing the complexity of power supply on the board (i.e: not need for a 12 Voltage rail).

The Low Pass Filter block 20 is made of an inductor 45 and a capacitor 44 with a cutoff frequency higher than the frequency used by the Standard Modulation, but lower than the $2^{nd}$ harmonic created by the PLC Line coupler. As a result only the LFB used by the Input signal will be found on the powerline.

The bridge rectifier (Rectifier 21), which is directly connected to the Phase and Neutral wires of the power line, is here to insure proper signal adaptation of the AC signal from the powerline. This allows the Transistor (i.e: MOS FET) 42 (Q1) to pull all required current during both the positive and negative phases.

The 30 (Amp Linear) present a feedback loop connected to VRef Out 28, so the voltage at 39 (R1) is equal to the voltage "Vref" 42 at any time. The Current drained from the grid presents the same modulation than the desired Signal.

This Current modulation ("I Q1_R1") 35 is independent of the network impedance as long as it stays higher than the required voltage for the polarization of Transistor (i.e: MOS FET) 47 (Q1) and as long as grid impedance is higher than 39 (R1).

When a DC Environment, mostly what is needed is to remove the bridge rectifier (Rectifier 21) to insure proper signal adaptation. It is important to notice that 22 (V+) voltage does not have to be a similar voltage to the DC line voltage and can be the same as for an AC system. Therefore it can be at +5V depending of the minimum voltage to polarizing Transistors (i.e: MOS FET) 42 (Q1).

Figure 4:
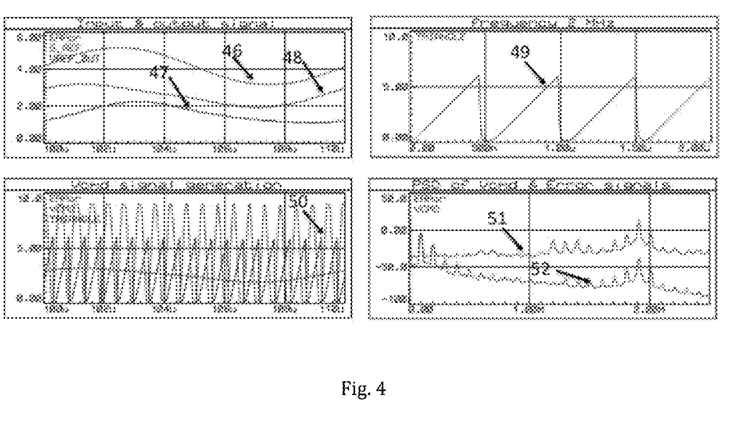
FIG. 4 shows signals of the transmission chain.
Figure 5:
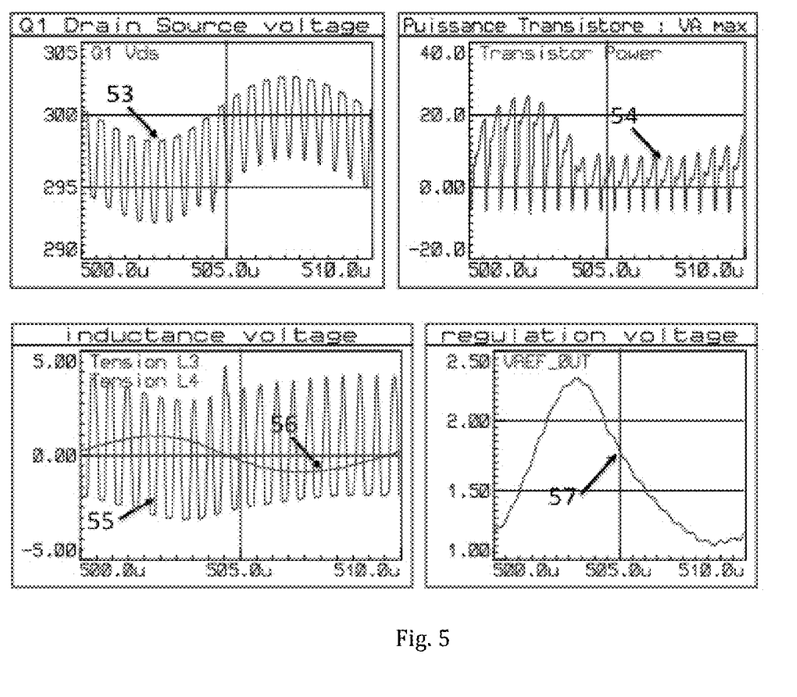
FIG. 5 shows signals of the Transistor Q1 42 to generate the Transmit signal on the powerline.

FIGS. 4 and 5 show experimental signals of the transmission chain leveraging the present invention. The situation is an AC grid presenting a 50 Hz frequency and 220 Volt peak-to-peak magnitude. The Input signal 23 is a pure tone at 100 KHz and 2 Volt peak-to-peak magnitude, which is used in Europe for some FSK modulation in a smartgrid environment.

FIG. 4 shows how the original signal 23 ("Input signal") is scale to give a reference signal 46, after being scale down through the electronic block 16. Signal 47 is the VRef_Out signal and is subtracted from signal 46 to create the Error signal 48 used as an input by the command block 18. Signal 49 is a Triangle signal of 2.2 MHz generated by the Triangle electronics 34 and used also as an input by the command block 18. Command signal 50 is the result of comparing 48 and 49 and will be used to command the Transistor Q1 42. 51 show the PSD of the Command signal and 52 show the one of the Error signal.

FIG. 5 is showing how the Command signal is used to drive the coupler and creates an Output signal 56. Signal 53 show the $V_{DS}$ on the Transistor Q1 42 as the result of applying the Command signal 50 while 54 show the current. 55 and 56 show the voltage respectively at the inductor 40 and 45. 57 show the voltage VRef_out signal 28.

Figure 6:
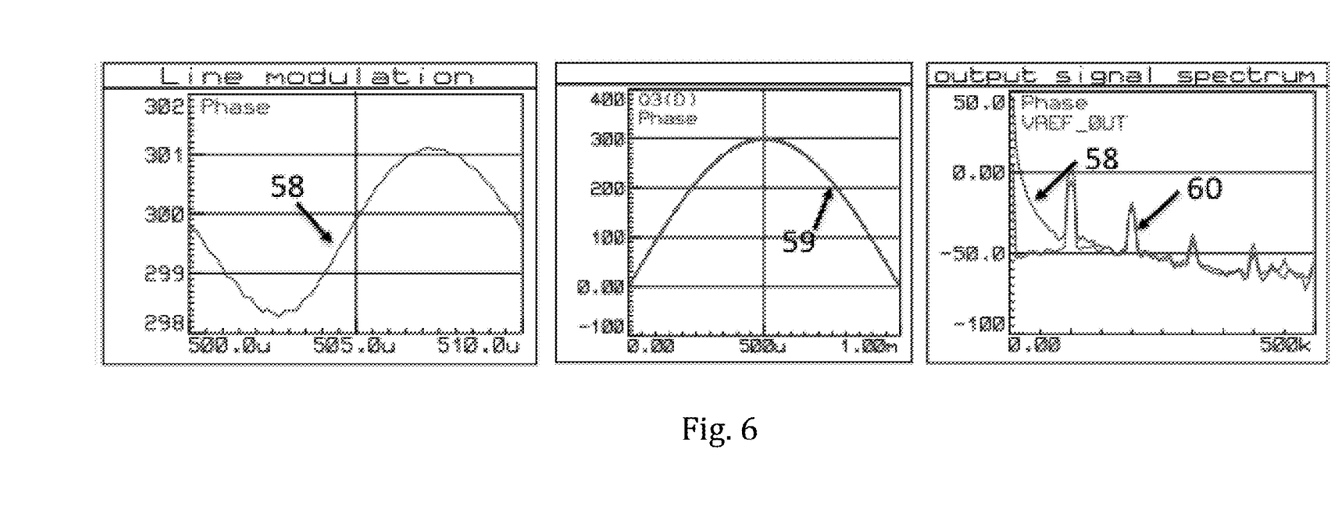
FIG. 6 shows signals of the generated Transmit signal on the powerline.

FIG. 6 shows the grid voltage modulation ("Phase" signal) 58 for a complete period of the Input signal (10 μs). The 59 follows the Input signal modulation 23 except when the grid voltage is very low, lower value than the Transistor (i.e: MOS FET) 47 $V_{DS}$ (Q1) polarization value (at zero crossing time). At that moment no signal is modulated.

60 show the PSD for the VRef_out signal 57 with the various harmonics while 58 is the PSD of the Phase signal and show the impact of the Low pass Filter block 20 as no harmonics above 100 KHz are on the phase line.

We claim:

1. A method for impedance modulation in an electrical network comprising:
   a. connecting a rectifier, a first low-pass filter and a buck structure wherein said rectifier and said low-pass filter is connected in series to said buck structure;
   b. assembling said buck structure to comprise a transistor connected to a second low-pass filter in parallel to a load thereby allowing feed back information to said transistor;
   c. further connecting said second low-pass filter to a circuit;
   d. assembling said circuit to comprise of a Linear Amplifier and a triangle generator wherein said triangle generator generates a triangle generator signal and wherein said Linear Amplifier compares a signal coming from said second low-pass filter to said triangle generator signal thereby generating a command signal to command said buck structure.

2. The method of claim 1 further comprising at least one components for electronic protection.

3. The method of claim 1 further comprising integrating said rectifier, said first low-pass filter and said buck structure into System on Chip.

4. The method of claim 1 wherein said electrical network is an Alternate Current network.

5. The method of claim 1 wherein said electrical network is a Direct Current network.

6. The method according to claim 1 wherein said electronical network is managing DC/AC conversion.

7. An apparatus for impedance modulation transmitting continuous modulated signal for communication purposes in an electrical network comprising of:
   a. a rectifier, a first low-pass filter and a buck structure;
   b. wherein said rectifier and said low-pass filter is connected in series to said buck structure;
   c. wherein said buck structure is comprised of a transistor connected to a second low-pass filter in parallel to a load thereby allowing feed back information to said transistor wherein said second low-pass filter is further connected to a circuit;
   d. wherein said circuit is comprised of a Linear Amplifier and a triangle generator wherein said triangle generator generates a triangle generator signal and wherein said Linear Amplifier performs a comparison between a signal coming from said second low-pass filter and said triangle generator signal thereby generating a command signal to command said buck structure.

8. The apparatus of claim 7 wherein said apparatus is integrated into a System on Chip.

9. The apparatus of claim 7 wherein said electronical network is managing DC/AC conversion.

* * * * *